Figure 1:
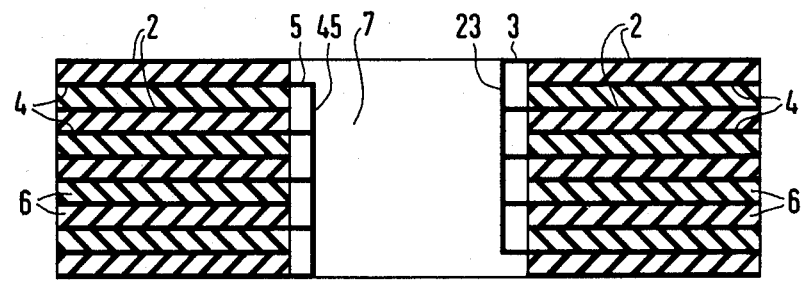

United States Patent [19]

Cirkel

[11] 4,115,833
[45] Sep. 19, 1978

[54] POWER CAPACITOR

[75] Inventor: Hans-Jürgen Cirkel, Erlangen, Germany

[73] Assignee: Kraftwerk Union Aktiengesellschaft, Mülheim (Ruhr), Germany

[21] Appl. No.: 822,675

[22] Filed: Aug. 8, 1977

[30] Foreign Application Priority Data

Aug. 6, 1976 [DE] Fed. Rep. of Germany ....... 2635471

[51] Int. Cl.² .......................................... H01G 1/013
[52] U.S. Cl. .................................. 361/303; 361/275; 361/307
[58] Field of Search ........................ 361/275, 303, 307

[56] References Cited

U.S. PATENT DOCUMENTS

| 1,578,977 | 3/1926 | Frasse | 361/275 X |
| 3,011,106 | 11/1961 | Ducati | 361/307 X |
| 3,275,916 | 9/1966 | Phillips | 361/303 |
| 3,346,790 | 10/1967 | Blank | 361/275 X |
| 3,461,363 | 8/1969 | Blank | 361/275 X |
| 3,514,678 | 5/1970 | Markarian | 361/303 |

Primary Examiner—E. A. Goldberg
Attorney, Agent, or Firm—Herbert L. Lerner

[57] ABSTRACT

Power capacitor with minimal self-inductance includes a stack of metal layers mutually superimposed perpendicularly to a given axis, with respective layers of insulation disposed between mutually adjacent metal layers of the stack, the metal layers and the insulation layers being formed with mutually aligned cut-outs in vicinity of the given axis so as to form a free space within the stack, respective surface portions of alternating layers of the metal layers projecting into the free space above one another as electrodes of given common polarity, the surface portions of the metal layers of respective opposite common polarity being disposed symmetrically with respect to the given axis in the free space.

5 Claims, 3 Drawing Figures

POWER CAPACITOR

The invention of the instant application relates to a power capacitor and, more particularly, to such a power capacitor having minimal self-inductance. For many applications, especially in the field of pulse technology, capacitors with maximal capacity but minimal self-inductance have become important. Charging voltages in the kilovolt range are prerequisite for storing large amounts of energy. Heretofore known capacitors, called low-inductance capacitors, having capacities of more than 1 $\mu$F are unsuited, because of the large self-inductance thereof, for some technical processes such as "fast" gas discharges with current increase periods in the order of 10 nanoseconds, for example. So-called strip-conductor capacitors, wherein wide, tape-like capacitor layers or electrodes are disposed one on top of the other, with the interposition of a dielectric, and are directly connected to the load, do indeed provide adequately low self-inductance, however, the capacity and, therefore, energy storage capability thereof has proven to be insufficient in most cases.

The problem has therefore arisen of establishing a capacitor construction principle wherein, for high self-capacitance, only a minimal self-inductance is exhibited and, simultaneously, for a high self-capacitance, the capacitor is operatable at high rated voltages and, in addition, permit very low inductance connection of a load. It is accordingly an object of the invention to provide a power capacitor which avoids the foregoing problem and meets all of the foregoing requirements.

With the foregoing and other objects in view, there is provided, in accordance with the invention, a power capacitor with minimal self-inductance comprising a stack of metal layers mutually superimposed perpendicularly to a given axis, with respective layers of insulation disposed between mutually adjacent metal layers of the stack, the metal layers and the insulation layers being formed with mutually aligned cut-outs in vicinity of the given axis so as to form a free space within the stack, respective surface portions of alternating layers of the metal layers projecting into the free space above one another as electrodes of given common polarity, the surface portions of the metal layers of respective opposite common polarity being disposed symmetrically with respect to the given axis in the free space.

In accordance with another feature of the invention, the surface portions of the metal layers of given common polarity are disposed opposite to and spaced from the surface portions of the metal layers of opposite common polarity.

In accordance with an added feature of the invention, the power capacitor includes electrically conducting bridge means for connecting the surface portions of the metal layers of given common polarity to one another and for connecting the surface portions of the metal layers of opposite common polarity to one another.

In accordance with an additional feature of the invention, the metal layers and the insulating layers have a washer-like shape, and the free space is defined by inner peripheral surfaces thereof and has the shape of a hollow cylinder open at opposite ends thereof.

In accordance with yet another feature of the invention, the cut-outs are formed laterally in the metal and the insulating layers, and the free space comprises a channel open at opposite ends and along a side thereof.

In accordance with yet a further feature of the invention, the free space is of a dimension for accommodating therein a load for consuming capacitor energy that is electrically connectible to the surface portions.

In accordance with a concomitant feature of the invention, the free space is of a dimension for accommodating therein a load for consuming capacitor energy, said load being electrically connectible to the bridge means.

Although the invention is illustrated and described herein as embodied in power capacitor, it is nevertheless not intended to be limited to the details shown, since various modifications and structural changes may be made therein without departing from the spirit of the invention and within the scope and range of equivalents of the claims.

Figure 2:
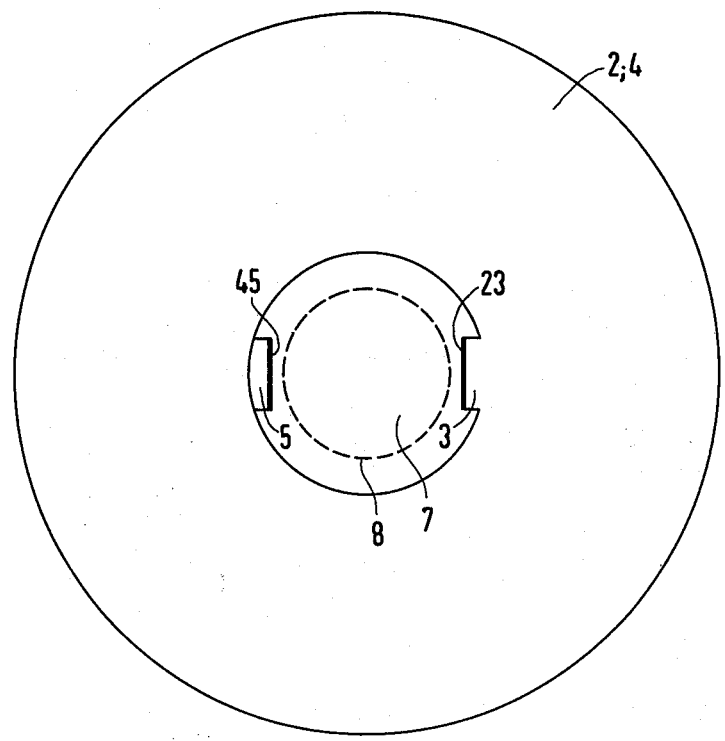
Figure 3:
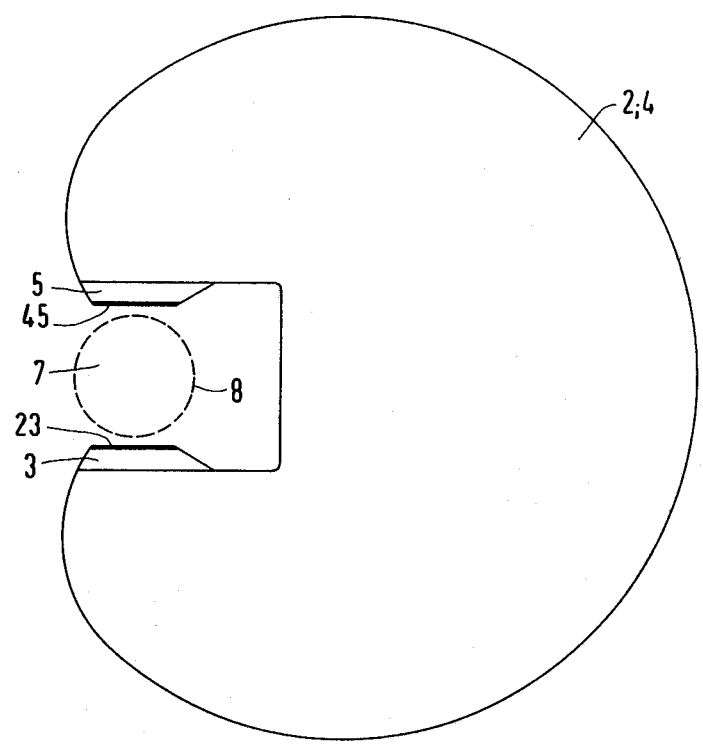

The construction and method of the invention, however, together with additional objects and advantages thereof will be best understood from the following description of specific embodiments when read in connection with the accompanying drawings, in which:

FIGS. 1 and 2 are a diametric sectional and top plan view, respectively, of one embodiment of an inductance power capacitor constructed in accordance with the invention; and FIG. 3 is a view similar to that of FIG. 2 of another embodiment of the invention.

Referring now to the drawing and first, particularly to FIGS. 1 and 2 thereof, there is shown an embodiment of the power capacitor of the invention formed of a stack of mutually superimposed metal layers or electrodes 2 and 4, as well as interposed insulating disks 6. The metal layers 2, 4, as well as the insulating disks 6 have a washer-like appearance, as seen in FIG. 2. An inner free space 7, defined by the inner peripheral surfaces of the metal layers 2, 4 and insulating disks 6, has the shape of a hollow cylinder. Surface portions 3 of the metal layers 2, as well as surface portions 5 of the metal layers 4 project into the free space 7. These surface portions 3 and 5 are respectively located one on top of the other and are connected between one another in the illustrated embodiment, by bridges 23 and 45, respectively. A load 8 which is disposed or mountable within the free space 7, can then be connected directly to these bridges 23 and 45 or the surface portions 3 or 5, respectively. The necessary connecting leads can thus be kept extremely short and, therefore, have low inductance, so that the rapid current increase periods, aforementioned in the introduction to this specification, can be obtained also for capacitance values above 1 $\mu$F amd, accordingly, for substantially greater energy storage with the same discharge characteristics than possible with the hereinaforementioned constructions according to the state of the art.

The construction of the capacitor electrode in the embodiment shown in FIG. 3 is also selected, however, so that the free space 7' is located to one side and is open at one side thereof. Then, the load 8' can be placed into this space 7' from the open side thereof, the leads as well as the inductances being kept small in the same manner. There is an additional possibility, however, of connecting the load 8' more readily to other operating devices such as non-illustrated cooling and pumping devices. In view of the desired high energies, the supply voltage, which is likewise applicable to the metal layers 2'/4' or to the bridges 23' and 45' or to non-illustrated bridges at the outer periphery of the stack, will be in the kilovolt range, so that it is advisable to make the capacitor layers with a rounded shape, somewhat circularly, but, in all cases, avoiding any corners. In special cases, the bridges 23' and 45' may be omitted, so that a multiplicity of individual electrodes, having the same or adjustable stored energy content, respectively, supply the inserted load.

As not shown in detail in the interest of clarity, a capacitor structure of the foregoing type is advisedly provided with solid end plates that are clamped together. Care must then be taken that no air or gas occlusions should remain between the capacitor layers or be formed thereat. From this point of view, it is advantageous to effect the assembly of such a capacitor in vacuum or in degassed insulating oil. The metal layers 2', 4' are formed of materials generally known in capacitor technology.

The shape of the free space 7, 7' can be entirely in accordance with the load 8, 8' to be mounted therein, such as cylindrical or channel-like, and, also, the position of the surface portions 3, 3' and 5, 5' of the bridges 23, 23' and 45, 45', respectively, can be matched or accommodated to the location of the corresponding current leads at the load 8, 8'.

There is claimed:

1. Power capacitor with minimal self-inductance comprising a stack of metal layers mutually superimposed perpendicularly to a given axis, with respective layers of insulation disposed between mutually adjacent metal layers of said stack, said metal layers and said insulation layers being formed laterally with mutually aligned cut-outs in vicinity of said given axis, said mutually aligned cut-outs collectively forming a free channel within said stack open at opposite ends and along a side thereof, respective surface portions of alternating layers of said metal layers projecting into said channel above one another as electrodes of given common polarity, the surface portions of the metal layers of respective opposite common polarity being disposed opposite one another and symmetrically with respect to said given axis in said channel.

2. Power capacitor according to claim 1 wherein the surface portions of the metal layers of given common polarity are disposed opposite to and spaced from the surface portions of the metal layers of opposite common polarity.

3. Power capacitor according to claim 1 including electrically conducting bridge means for connecting the surface portions of the metal layers of given common polarity to one another and for connecting the surface portions of the metal layers of opposite common polarity to one another.

4. Power capacitor according to claim 1 wherein said free space is of a dimension for accommodating therein a load for consuming capacitor energy, said load being electrically connectible to said surface portions.

5. Power capacitor according to claim 3 wherein said free space is of a dimension for accommodating therein a load for consuming capacitor energy, said load being electrically connectible to said bridge means.

* * * * *